United States Patent
Oh

(10) Patent No.: US 10,513,062 B2
(45) Date of Patent: Dec. 24, 2019

(54) PRESS-MOLDING APPARATUS FOR COSMETIC PATCH

(71) Applicant: Han Sun Oh, Chungcheongbuk-do (KR)

(72) Inventor: Han Sun Oh, Chungcheongbuk-do (KR)

( * ) Notice: Subject to any disclaimer, the term of this patent is extended or adjusted under 35 U.S.C. 154(b) by 328 days.

(21) Appl. No.: 15/175,351

(22) Filed: Jun. 7, 2016

(65) Prior Publication Data

US 2017/0259471 A1    Sep. 14, 2017

(30) Foreign Application Priority Data

Mar. 10, 2016    (KR) .................. 20-2016-0001276 U

(51) Int. Cl.
| | | |
|---|---|---|
| *B29C 43/40* | (2006.01) | |
| *A45D 44/00* | (2006.01) | |
| *B29C 43/50* | (2006.01) | |
| B29K 105/00 | (2006.01) | |
| B29L 31/00 | (2006.01) | |

(52) U.S. Cl.
CPC .............. *B29C 43/40* (2013.01); *A45D 44/00* (2013.01); *B29C 43/50* (2013.01); *B29C 2043/503* (2013.01); *B29K 2105/0061* (2013.01); *B29K 2713/00* (2013.01); *B29L 2031/718* (2013.01)

(58) Field of Classification Search
CPC ... B29C 43/40; B29C 43/50; B29C 2043/503; A45D 2200/1036
USPC ........................................ 425/298, 299, 300
See application file for complete search history.

(56) References Cited

U.S. PATENT DOCUMENTS

| | | | | |
|---|---|---|---|---|
| 2,246,424 A | * | 6/1941 | Gainer ................. | A21C 11/106 30/301 |
| 2,346,242 A | * | 4/1944 | Gainer ................... | A21C 11/10 30/301 |
| 2,820,423 A | * | 1/1958 | Carmine .............. | A21C 11/106 425/298 |
| 3,263,011 A | * | 7/1966 | Jagger ...................... | B26F 1/02 264/153 |
| 3,280,238 A | * | 10/1966 | Calvert ................... | B29C 43/00 264/163 |
| 3,585,689 A | * | 6/1971 | Brown et al. ........... | B29C 51/18 100/264 |
| 8,348,441 B1 | * | 1/2013 | Skelton ............ | B29D 11/00596 359/838 |
| 9,033,693 B2 | * | 5/2015 | Palazzolo ............ | A21C 11/106 425/118 |

(Continued)

FOREIGN PATENT DOCUMENTS

KR    10-2012-0116278    10/2012

*Primary Examiner* — Seyed Masoud Malekzadeh
(74) *Attorney, Agent, or Firm* — Dentons US LLP

(57) ABSTRACT

Disclosed is a press-molding apparatus for a cosmetic patch, suitable for use in cutting a piece of patch fabric to a predetermined shape while being pressed using a press, including: a planar pressing plate, which forms a pressing portion of the press; at least one cutter, which is fixedly secured to the lower surface of the pressing plate and protrudes therefrom so as to cut the piece of patch fabric through pressing of the press, and is formed in a cylindrical shape so that a plurality of stacked pieces of patch fabric is simultaneously cut and the cut pieces of patch fabric are received in the space inside the cutter; and an ejector, which separates the pieces of patch fabric received in the cutter from the cutter.

3 Claims, 3 Drawing Sheets

(56) References Cited

U.S. PATENT DOCUMENTS

| | | | |
|---|---|---|---|
| 9,578,886 B2* | 2/2017 | Palazzolo | A21C 11/106 |
| D813,453 S * | 3/2018 | Oh | D28/9 |
| 2005/0132579 A1* | 6/2005 | Sartori | A21C 11/106 |
| | | | 30/299 |
| 2009/0255413 A1* | 10/2009 | Ewald | A47J 43/20 |
| | | | 99/426 |
| 2012/0231105 A1* | 9/2012 | Palazzolo | A21C 11/106 |
| | | | 425/292 |
| 2016/0030301 A1* | 2/2016 | Baracat-Nasr | A61K 8/0216 |
| | | | 264/328.1 |

* cited by examiner

PRESS-MOLDING APPARATUS FOR COSMETIC PATCH

CROSS-REFERENCE TO RELATED APPLICATION

This application claims priority to Korean Patent Application No. 20-2016-0001276 filed on Mar. 10, 2016 and all the benefits accruing therefrom under 35 U.S.C. § 119, the contents of which are incorporated by reference in their entirety.

BACKGROUND OF THE INVENTION

1. Field of the Invention

The present invention relates to a press-molding apparatus and, more particularly, to a press-molding apparatus for a cosmetic patch, in which a plurality of stacked pieces of patch fabric is cut to a predetermined shape while being pressed using a press, and the cut pieces of patch fabric may be easily separated from a cutter.

2. Description of the Related Art

Typically, a cosmetic component is mainly used in the form of a liquid or lotion when being used so as to be absorbed into the skin as makeup. However, it may be manufactured in the form of a film having a predetermined shape, and thus, a cosmetic patch having a hydrogel-type cosmetic component applied thereon is also useful.

The base for such a patch may include an aqueous base, an oil base, an emulsion base, etc. In the case where the aqueous base contains oil as an active ingredient, it is difficult to increase the amount thereof and to simultaneously realize a thin film.

Furthermore, an oil or emulsion base is composed mainly of rubber or a synthetic resin, which has a strong tendency to agglomerate and is typically a hard gel, and thus it is difficult to increase the amount of the active ingredient and movement thereof in the base is slow. This is because the active ingredient is simply physically contained in the base, rather than being contained through chemical affinity.

Since the base for a patch must exhibit specific functions, including retention of its morphology and efficient attaching or detaching of the patch to or from a target, an oil base having a strong tendency to agglomerate is mainly utilized. For the oil base, however, movement of the active ingredient contained therein is not efficient.

Typically, a patch for a cosmetic is of an adhesive-dispersion type, in which an adhesive gel is cast on a piece of nonwoven fabric, or a hydrogel patch using sodium alginate, chitosan, etc. is useful. Such a patch has poor skin adhesion, and is dried upon usage and is thus easily separated from the skin, undesirably resulting in a short period of availability.

In the case where such a cosmetic patch is manufactured, a hydrogel containing a cosmetic component is applied on each piece of patch fabric, and respective pieces of patch fabric are manually cut, stacked, and packaged, undesirably resulting in a long manufacturing time and low accuracy.

Thus, when a variety of cosmetic patches are manufactured using a hydrogel, cutting of the hydrogel, which is regarded as important and difficult, is under study.

Korean Patent Application Publication No. 10-2012-0116276.

SUMMARY OF THE INVENTION

Accordingly, the present invention has been made keeping in mind the problems encountered in the related art, and an object of the present invention is to provide a press-molding apparatus for a cosmetic patch, wherein pieces of patch fabric, each of which is coated with a cosmetic hydrogel, may be simultaneously cut to a predetermined shape, and the cut pieces of patch fabric may be easily separated from the cutter.

In order to accomplish the above object, the present invention provides a press-molding apparatus for a cosmetic patch, suitable for use in cutting a piece of patch fabric to a predetermined shape while being pressed using a press, comprising: a planar pressing plate, which forms a pressing portion of the press; at least one cutter, which is fixedly secured to a lower surface of the pressing plate and protrudes therefrom so as to cut the piece of patch fabric through pressing of the press, and is formed in a cylindrical shape so that a plurality of stacked pieces of patch fabric is simultaneously cut and the cut pieces of patch fabric are received in a space inside the cutter; a cutter jig, which is placed on the uppermost piece of patch fabric and has a through hole therein, corresponding in size to the outer diameter of the cutter, so as to accurately position the cutter thereon; and an ejector, which separates the pieces of patch fabric received in the cutter from the cutter.

For example, the cutter may include: a cutter body, which is formed in a circular shape and is fixedly secured to the lower surface of the pressing plate; a division part, which bisects a space inside the cutter body and extends in a length identical to a length of the cutter body so as to cut the piece of patch fabric together with the cutter body; and an air vent hole, which is formed through an upper end of the cutter body and discharges air inside the cutter body to an outside upon cutting of the piece of patch fabric.

The division part may bisect the space inside the cutter body in point symmetry.

More specifically, the division part may be provided in the form of a curved partition so that the space inside the cutter body is bisected in a Yin-Yang pattern.

For example, the ejector may include: a plurality of communication holes, which are formed through the pressing plate and communicate with the space inside the cutter; an ejector plate formed in a size corresponding to the pressing plate; and a plurality of ejector rods, which are fixedly secured to the ejector plate at positions corresponding to the communication holes, and are formed to be longer than the cutter and thus inserted into the space inside the cutter via the communication holes formed in the pressing plate so that the pieces of patch fabric are separated from the cutter.

According to the present invention, in the press-molding apparatus for a cosmetic patch, a cutter body for a cutter is provided in a cylindrical shape, and thus, pieces of patch fabric, which are stacked, can be simultaneously cut. In the cutting process, the pressure inside the cutter body is discharged via an air vent hole, thus realizing efficient and uniform cutting.

Also, according to the present invention, the division part of the cutter bisects the space inside the cutter body, whereby the pieces of patch fabric can be divided into two portions while being cut in a circular shape. In particular, the division part is provided in the form of a curved partition, so that the space inside the cutter body can be bisected in point symmetry and thus the pieces of patch fabric are cut in a Yin-Yang pattern. Accordingly, the cut and divided pieces of patch fabric can be respectively attached to the left and right eyes.

Also, according to the present invention, ejector rods of the ejector are inserted into the space inside the cutter via the communication holes formed in the pressing plate, thus easily separating the cut pieces of patch fabric, which are received in the space inside the cutter, from the cutter.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Exemplary embodiments of the present invention will be described more fully hereinafter with reference to the accompanying drawings. In the following description of the present invention, detailed descriptions of known functions and components incorporated herein will be omitted when it may make the subject matter of the present invention unclear.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
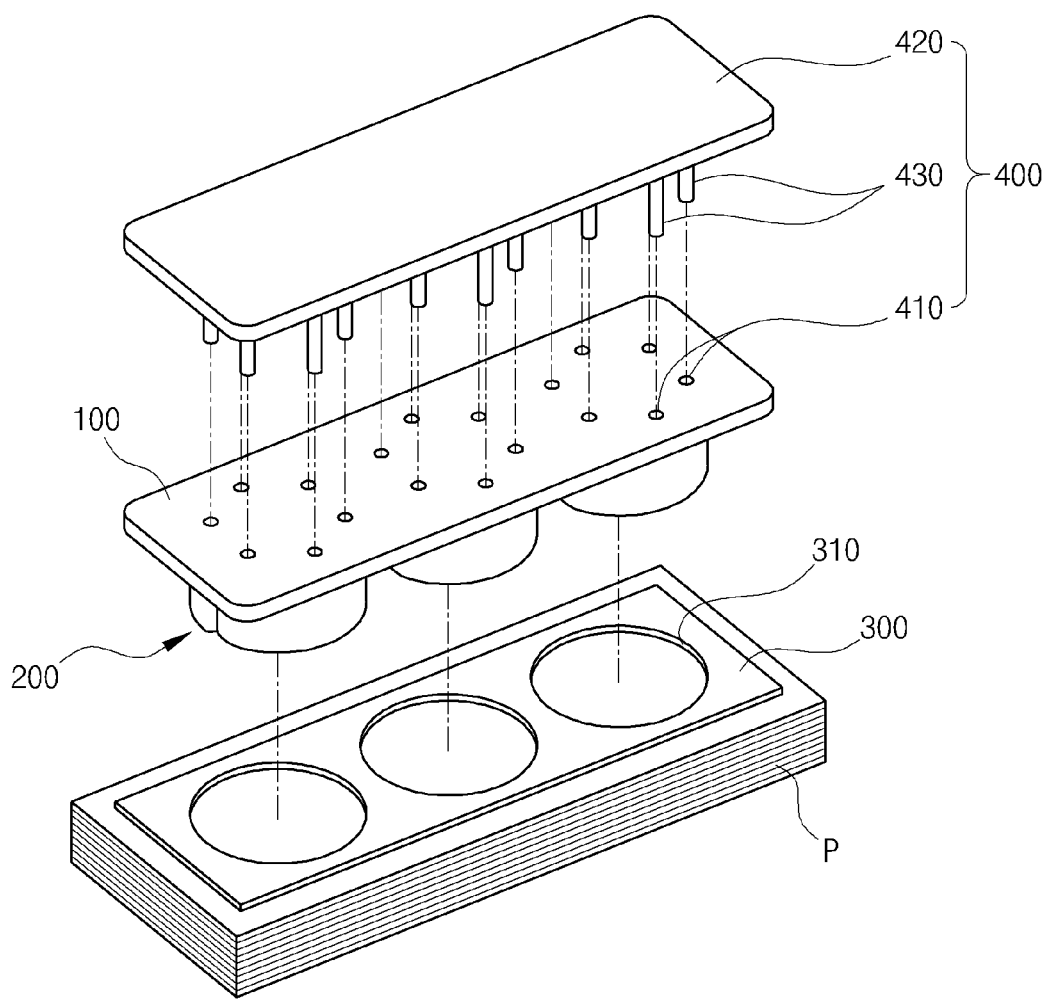
FIG. 1 is an exploded perspective view illustrating a press-molding apparatus for a cosmetic patch according to the present invention.

According to the present invention, the press-molding apparatus for a cosmetic patch may be configured to include a pressing plate 100, a cutter 200, and an ejector 400, as illustrated in FIG. 1.

Figure 4:
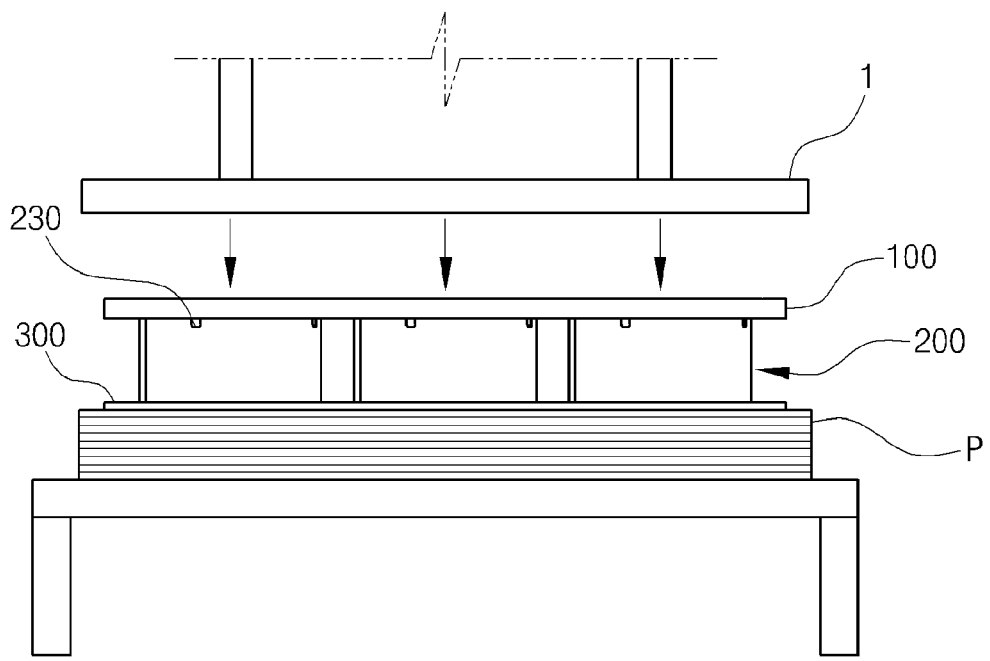
FIG. 4 is a front view illustrating the press-molding apparatus for a cosmetic patch according to the present invention, during use thereof.

As illustrated in FIG. 4, the pressing plate 100 is a member that constitutes the pressing portion of a press 1.

Figure 2:
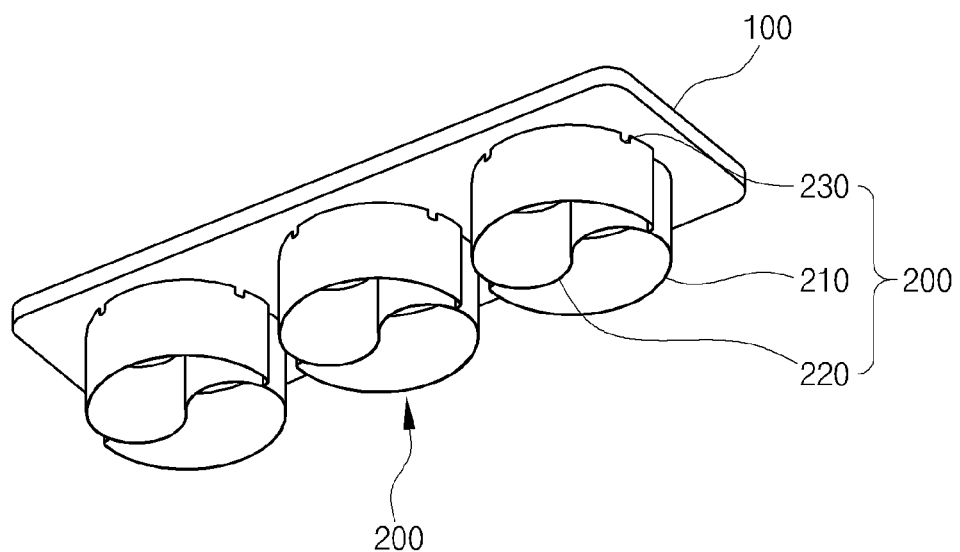
FIG. 2 is a perspective view illustrating a pressing plate and a cutter according to the present invention when viewed from below.

As illustrated in FIGS. 1 and 2, the pressing plate 100 is provided in the form of a rectangular or square shape, and may be made of a metal material or a synthetic resin material.

The cutter 200 is an element that is fixedly secured to the lower surface of the pressing plate 100 so as to cut a piece of patch fabric P to a predetermined shape while being pressed by the press 1. As illustrated in FIGS. 1 and 4, a plurality of stacked pieces of patch fabric P may be simultaneously cut to the same shape.

Figure 3:
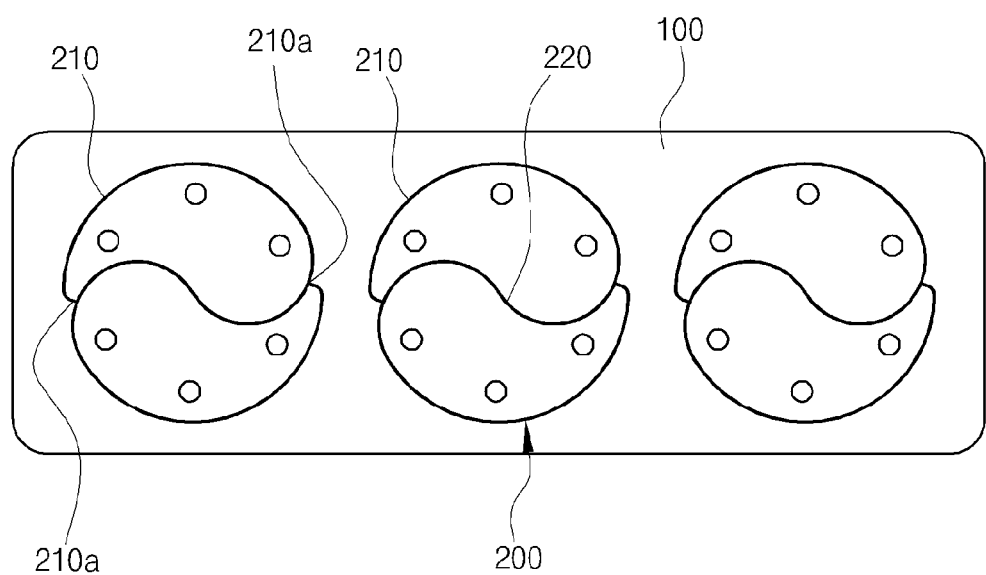
FIG. 3 is a bottom plan view illustrating the pressing plate and the cutter of FIG. 2.

As illustrated in FIGS. 2 and 3, the cutter 200 may be configured to include a cutter body 210, a division part 220, and an air vent hole 230.

As illustrated in FIG. 2, the cutter body 210 is a member that has a cylindrical shape, and is fixedly secured to the lower surface of the pressing plate 100 so as to protrude therefrom. Such a cutter body cuts the plurality of stacked pieces of patch fabric P while being moved downward together with the pressing plate 100 by the pressing of the press 1, so that the cut pieces of fabric are received in the space inside the cutter body.

The cutter body 210 is formed in a cylindrical shape from steel and is integratedly fixed to the lower surface of the pressing plate 100.

As illustrated in FIG. 2, a plurality of cutter bodies 210 is preferably fixed to the pressing plate 100, or alternatively, a single cutter body 210 may be provided.

As illustrated in FIG. 3, the cutter body 210 may include depressions 210a that form recesses on opposite sides of the outer surface thereof.

The depressions 210a function as grasping recesses that facilitate the one-by-one separation of the stacked pieces of patch fabric P cut by the cutter body 210 when a user intends to individually use the cut pieces of fabric.

Specifically, the piece of patch fabric P that is located in the uppermost position may be easily grasped and separated by a user through the grasping recesses defined by the depressions 210a.

As illustrated in FIGS. 2 and 3, the division part 220 is an element that bisects the space inside the cutter body 210 so that the piece of patch fabric P is cut into two portions.

The division part 220 is made of the same material as that of the cutter body 210, and is formed to have the same length as that of the cutter body 210, so that the space inside the cutter body 210 may be bisected.

As such, the division part 220 may bisect the space inside the cutter body 210 in point symmetry. More preferably, as illustrated in FIG. 3, the division part is provided in the form of a curved partition so that the space inside the cutter body 210 may be bisected in a Yin-Yang pattern.

Therefore, the piece of patch fabric P may be cut and divided into two portions along a Yin-Yang pattern by the cutter body 210 and the division part 220.

The portions of the piece of patch fabric P, which are symmetrical, may be attached to, for example, the left and right eyes of the face, respectively.

The air vent hole 230 is an element that enables the efficient cutting process by discharging the air (pressure)

inside the cutter body 210 to the outside upon cutting of the pieces of patch fabric P by the pressing of the press 1.

As the top of the cutter body 210, which is in a cylindrical shape, is closed by the pressing plate 100, pressure may accumulate therein during the cutting process, and the cutter body 210 may communicate with the outside by means of the air vent hole 230, thereby discharging the pressure from the inside to the outside.

As illustrated in FIGS. 2 and 4, the air vent hole 230 is preferably formed through the upper end of the cutter body 210. Preferably, a plurality of air vent holes is formed in the circumferential direction of the cutter body 210.

As illustrated in FIG. 1, when communication holes 410 are formed in the pressing plate 100, as will be described later, they are responsible for discharging the pressure inside the cutter body 210 to the outside. In the cutting process, however, since the communication holes 410 come into close contact with the press 1, the air inside the cutter body is discharged through the air vent holes 230.

The ejector 400 is an element that separates the pieces of patch fabric P, which are cut by being pressed by the press 1 and are thus received in the cutter body 210, from the cutter body 210.

As illustrated in FIG. 1, the ejector 400 may be configured to include communication holes 410, an ejector plate 420, and ejector rods 430.

As illustrated in FIG. 1, the communication holes 410 are formed through the pressing plate 100 and communicate with the space inside the cutter body 210.

As illustrated in FIG. 1, the ejector plate 420 is manufactured to a size corresponding to the pressing plate 100.

The ejector rods 430 are fixedly secured to the positions corresponding to the communication holes 410 so as to protrude a long distance from the lower surface of the ejector plate 420, and are inserted into the space inside the cutter body 210 via the communication holes 410, whereby the pieces of patch fabric P are separated from the space inside the cutter body.

The pieces of patch fabric P, which are received in the space inside each cutter 200, may be separated together from the cutter 200 by means of the ejector 400.

According to the present invention, a cutter jig 300 may be further provided, as illustrated in FIG. 1.

The cutter jig 300 is an element that accurately positions a plurality of cutters 200 on the uppermost piece of patch fabric P in the cutting process, and is provided in the form of a planar shape and has through holes 310 therein, corresponding in size to the outer diameter of the cutter 200, as illustrated in FIG. 1.

Thus, the cutters 200 are fitted into respective through holes 310 in the cutter jig 300 and are accurately aligned, whereby the cutting process is performed.

The process of cutting the piece of patch fabric P, using the press-molding apparatus according to the present invention including the elements configured as above, is described with reference to FIG. 4.

Specifically, pieces of patch fabric P, which are stacked, are placed on a working table, the cutter jig 300 is placed on the uppermost piece of patch fabric P, the pressing plate 100 having the cutters 200 is transported, and the cutters 200 are inserted into the through holes 310 in the cutter jig 300 and thus accurately positioned.

The worker operates the press 1 so that the pressing plate 100 and the cutters 200 are moved downward.

Accordingly, while the cutters 200 are moved downward, the pieces of patch fabric P are cut and received in the spaces inside the cutters. As such, the air inside each cutter body 210 is discharged to the outside via the air vent holes 230, and the cutters 200 are efficiently moved downward to perform the cutting process.

After completion of the cutting process, the press 1 is separated from the pressing plate 100, and the ejector rods 430 of the ejector 400 are inserted into the communication holes 410 formed in the pressing plate 100, whereby the pieces of patch fabric P, which are received in the cutters 200, are separated from the cutters 200.

The stacked pieces of patch fabric P, which are separated from the cutters 200, are placed in a packaging container and then packaged.

As described above, the press-molding apparatus for a cosmetic patch according to the present invention is configured such that the cutter body 210 of the cutter 200 is provided in a cylindrical shape and thus the stacked pieces of patch fabric P can be simultaneously cut. Furthermore, in the cutting process, the pressure inside the cutter body 210 may be discharged via the air vent holes 230, thus realizing efficient and uniform cutting.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A press-molding apparatus for a cosmetic patch, suitable for use in cutting one or more predetermined shaped pieces out of one or more pieces of patch fabric while using a press, comprising:
   a planar pressing plate, which forms a pressing portion of the press;
   at least one cutter, which is (a) fixedly secured to a lower surface of the pressing plate and protrudes therefrom in an axial direction so as to cut each piece of patch fabric through pressing of the press and (b) formed in a cylindrical shape such that two cut pieces of patch fabric are cut out of each of the one or more pieces of patch fabric and the cut pieces of patch fabric are received in a space inside the at least one cutter; and
   an ejector, which separates the cut pieces of patch fabric received in the at least one cutter from the cutter,
   wherein,
   (a) the at least one cutter comprises:
      (1) a cutter body, which is formed in a circular cylindrical shape with a circular cross section which is orthogonal to the axial direction and which is fixedly secured to the lower surface of the pressing plate;
      (2) a division part, which (a) is provided in a form of a curved partition, (b) bisects the circular cross section of the cutter body, and (c) extends in a length identical to an axial length of the cutter body so as to cut the two cut pieces of patch fabric out of each piece of patch fabric while cutting out the two cut pieces of patch fabric with a circular shape; and
      (3) an air vent hole, which is formed through an upper end of the cutter body and discharges air inside the cutter body to an outside upon cutting of each piece of patch fabric, and
   (b) the cutter body comprises depressions, which form axially extending recesses on opposite sides of an outer surface of the cutter body.

2. The press-molding apparatus of claim 1, wherein the division part bisects the cross section of the cutter body in point symmetry.

3. The press-molding apparatus of claim 2, wherein the division part is provided in the form of the curved partition 5 so that the space inside the cutter body is bisected in the cross section in a Yin-Yang pattern.

\* \* \* \* \*